United States Patent [19]
Kightlinger et al.

[11] 3,810,446
[45] May 14, 1974

[54] ANIMAL FOOD BOWL AND COVER THEREFOR

[76] Inventors: Ronald J. Kightlinger, 11917 Paso Robles Ave., Granada Hills, Calif. 91344; Robert S. Goodrich, 27901 S. Golden Meadow Dr., Palos Verdes Peninsula, Calif. 90274

[22] Filed: July 18, 1973

[21] Appl. No.: 380,149

[52] U.S. Cl. ................................................ 119/61
[51] Int. Cl. ............................................. A01k 5/00
[58] Field of Search ..................... 119/61, 51, 51.5

[56] References Cited
UNITED STATES PATENTS

| | | | |
|---|---|---|---|
| 2,612,137 | 9/1952 | Fuls | 119/61 X |
| 3,152,576 | 10/1964 | Faurot | 119/51.5 |
| 3,722,476 | 3/1973 | Van Ness et al. | 119/61 |
| 3,455,280 | 7/1969 | Keene | 119/61 |

*Primary Examiner*—Hugh R. Chamblee
*Attorney, Agent, or Firm*—Donald Diamond

[57] ABSTRACT

An animal food bowl and cover therefor are provided which have cooperating means as, for example, a bead and yieldable channel combination for releasably and rotatably securing the cover to the bowl. The cover has a limited access aperture which permits an animal with drooping ears to have access to food contained within the bowl while excluding the animal's ears from the contents of the bowl. In addition, the cover is provided with means to facilitate selective enlargement of the aperture which may take the form of score lines in the outer surface of the cover at successively increasing distances from the aperture. The bowl is provided with an outwardly disposed skirt which extends beyond the bottom of the bowl with the lower end of the skirt being provided with anti-skid means.

10 Claims, 3 Drawing Figures

ANIMAL FOOD BOWL AND COVER THEREFOR

BACKGROUND OF THE INVENTION

This invention relates to animal food bowls and, more particularly, to an animal food bowl and cover therefor in which the cover is provided with a limited access aperture which permits an animal to have access to food contained within the bowl while excluding the animal's ears from the contents of the bowl.

There are numerous breeds of dogs with large drooping ears. One of the problems encountered in feeding a dog with this characteristic from an open-mouth food bowl is that the drooping ears come into contact with the food contained in the bowl. As a result, food adheres to the ears and may become caked to or imbedded in the ears. This causes the dog to have an unkempt appearance and can lead to infectious conditions. A variety of makeshift devices have been employed to hold the drooping ears back and away from the food while the dog is eating but none of the makeshift devices has been found to be particularly practical.

OBJECTS

Accordingly, an object of this invention is to provide an animal food bowl and cover therefor wherein the cover has an opening which allows an animal to have access to food contained within the bowl while excluding the animal's ears from the contents of the bowl.

Another object of this invention is to provide a bowl and cover of the character described wherein the cover is releasably and rotatably secured to the bowl.

A further object of this invention is to provide a bowl and cover of the character described wherein the cover includes means to facilitate selective enlargement of the opening in the cover in order to accommodate dogs of increasing size.

A still further object of this invention is to provide a bowl and cover of the character described wherein the bowl portion includes an outwardly disposed skirt which extends beyond the bottom wall of the bowl and the lower end of the skirt is provided with anti-skid means.

SUMMARY OF THE INVENTION

In accordance with this invention, there is provided an animal food bowl and cover assembly which comprises an open-mouth bowl and cover therefor with the bowl and cover having cooperating means for releasably and rotatably securing the cover to the bowl and, additionally, the cover has a limited access aperture which permits an animal to have access to food contained within the bowl while excluding the animal's ears from the contents of the bowl.

The cooperating means for releasably and rotatably securing the cover to the bowl advantageously comprise a convexo-concave, bead and yieldable channel combination with the head taking the form of a convex rib member attached to the rim of the bowl and disposed outwardly about the upper margin of the bowl and the channel for the convex rib being a concave side wall depending downwardly from the peripheral edge of the cover.

The aperture in the cover has, preferably, an elongated configuration and means are included in the cover to facilitate selective enlargement of the aperture. These means include a plurality of score lines in the outer surface of the cover which are substantially parallel to the elongated sides of the aperture and at successively increasing distances from the aperture. The opposite ends of the score lines terminate in perimetrical score lines which lead to the corresponding short sides of the aperture.

The bowl portion of the bowl and cover assembly advantageously includes a skirt member which is disposed outwardly of the bowl and extends downwardly beyond the bottom of the bowl with the lower end of the skirt member being provided with antiskid means to reduce slippage on a support surface.

DETAILED DESCRIPTION

Figure 1:
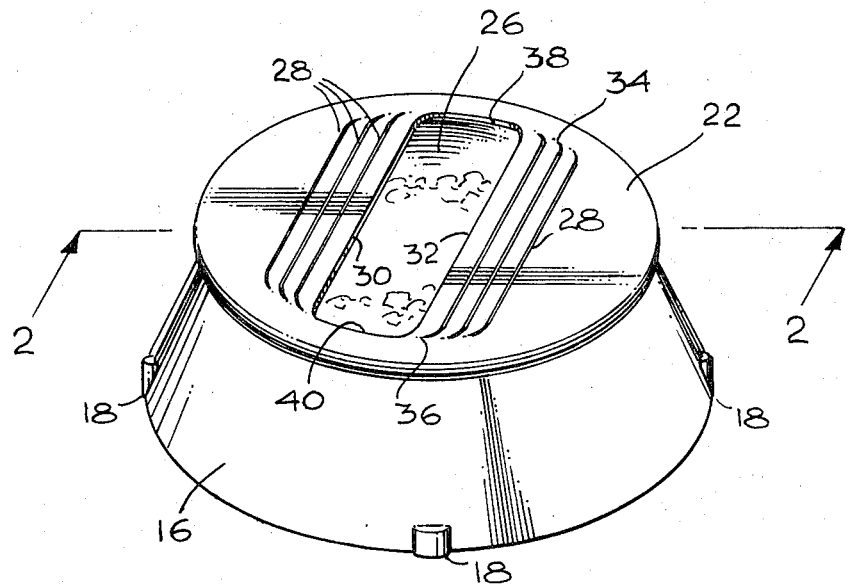
FIG. 1 is a perspective view of the animal food bowl and cover assembly of this invention.
Figure 2:
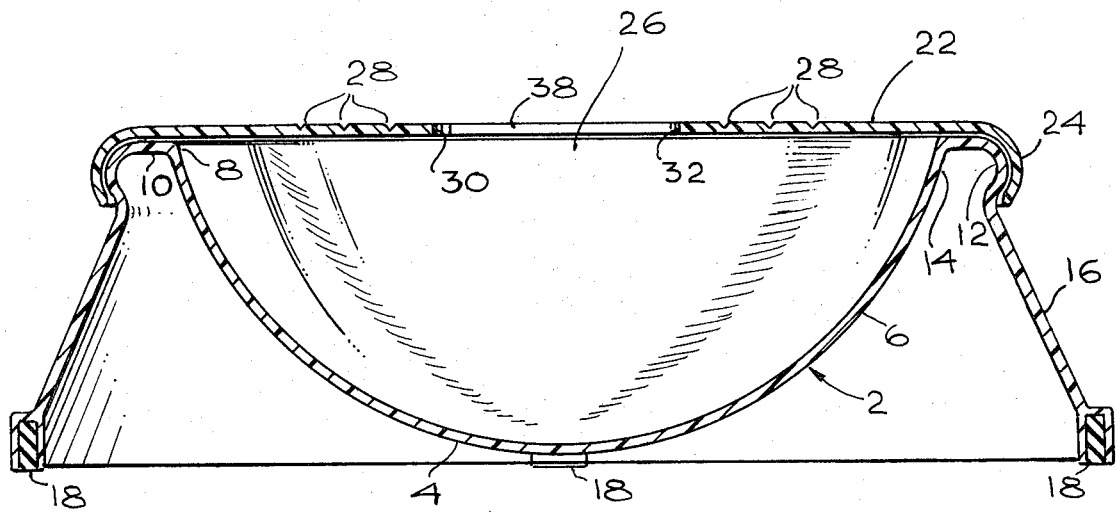
FIG. 2 is a transverse section along line 2—2 of FIG. 1.
Figure 3:
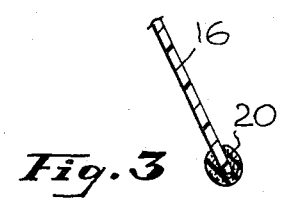
FIG. 3 shows an alternative anti-skid member in the form of a continuous grommet attached to the lower edge of the skirt.

Referring to the drawings, there is shown an open-mouth bowl 2 having, generally, a hemispherical configuration. The bowl has a bottom wall portion 4 which is continuous with an upwardly extending side wall portion 6. The upper end of the side wall terminates in a rim 8 which is contiguous with an outwardly extending lip 10. The outer end of the lip curves downwardly and inwardly to form a bead or convex rib member 12 which is spaced from and disposed perimetrically about the upper margin 14 of the bowl. A skirt 16 is contiguous with the lower end of the convex rib member and extends downwardly beyond the bottom wall portion of the bowl. The skirt, which diverges outwardly with respect to the side wall portion of the bowl, is provided with a plurality of anti-skid members 18 which are disposed about the lower edge of the skirt with each anti-skid member comprising a friction bearing component and appropriate holder or support therefor. In an alternative embodiment, the anti-skid member may take the form of a continuous friction bearing grommet 20 attached to the lower edge of the skirt by means of a U-shaped groove in the grommet as illustrated in FIG. 3.

A cover 22 is provided for the open-mouth bowl. The cover terminates at its peripheral edge in a downwardly directed side wall in the form of a concave and yieldable channel member 24 which is adapted to overlie and slidably engage the rib member attached to the rim of the bowl and thus provide a convexo-concave, rib and channel combination for releasably and rotatably securing the cover to the bowl.

The cover is also provided with an elongated aperture 26 which permits a dog with drooping ears to have access to food contained within the bowl while excluding the dog's ears from the contents of the bowl. In order to be able to accommodate dogs of increasing size, the cover is provided with means to facilitate selective enlargement of the aperture. These means include a plurality of score lines 28 in the outer surface of the cover which are substantially parallel to the elongated sides 30, 32 of the aperture and at successively increasing distances from the aperture. The opposite ends of the score lines terminate in perimetrical score lines 34, 36 which lead to the corresponding short sides of the aperture 38, 40. Since the cover will usually be fabricated from plastic materials, the aperture may be easily and readily enlarged by cutting the cover along the score lines with an ordinary knife or scissors.

When the bowl and cover assembly is to be used for feeding purposes, food is added to the open-mouth bowl and the cover is attached to the bowl by pressing it downwardly onto the rim and lip of the bowl until the yieldable, concave side wall snaps over the convex rib so as to position the rib within the side wall channel. Since the cover is rotatably secured to the bowl, it will move with the movement of the dog's head within the bowl and, thus, the dog will have access to all sides of the bowl while the dog's ears are excluded from the contents of the bowl.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. An animal food bowl and cover assembly which comprises:
    an open-mouth bowl and cover therefor with said bowl and said cover being provided with cooperating means for releasably and rotatably securing the cover to the bowl, and
    said cover having a limited access aperture which permits an animal to have access to food contained within the bowl while excluding the animal's ears from the contents of the bowl.

2. An assembly according to claim 1 wherein the cooperating means for releasably and rotatably securing the cover to the bowl comprise a convexo-concave, bead and yieldable channel combination.

3. An assembly according to claim 2 wherein the bead comprises a convex rib member attached to the rim of the bowl and disposed outwardly about the upper margin of the bowl and the channel comprises a concave side wall depending downwardly from the peripheral edge of said cover.

4. An assembly according to claim 3 wherein the cover is provided with means to facilitate selective enlargement of the aperture in said cover.

5. An assembly according to claim 4 wherein the aperture in the cover has an elongated configuration and the means to facilitate enlargement of the aperture comprise a plurality of score lines in the outer surface of the cover at successively increasing distances from each of the elongated sides of the aperture with the opposite ends of the score lines terminating in perimetrical score lines leading to the corresponding short sides of the aperture.

6. An assembly according to claim 5 wherein the lower end of the convex rib member is contiguous with a downwardly disposed skirt with said skirt extending beyond the bottom of the bowl.

7. An assembly according to claim 6 wherein said skirt diverges outwardly with respect to the side wall of the bowl.

8. An assembly according to claim 7 wherein the lower end of the skirt is provided with anti-skid means.

9. An assembly according to claim 8 wherein the anti-skid means comprise a plurality of friction bearing members and holders therefor with said holders being disposed about the lower end of said skirt.

10. An assembly according to claim 8 wherein the anti-skid means comprises a continuous friction bearing member disposed about and secured to the lower end of the skirt.

* * * * *